United States Patent
Fang et al.

(10) Patent No.: US 9,074,107 B2
(45) Date of Patent: Jul. 7, 2015

(54) VEHICLE WHEEL AND HUB PROTECTANT FILM AND COMPOSITION FOR THE FORMATION THEREOF

(71) Applicants: Jiafu Fang, Spring, TX (US); Liliana Minevski, The Woodlands, TX (US); Tze-Lee Phang, Katy, TX (US)

(72) Inventors: Jiafu Fang, Spring, TX (US); Liliana Minevski, The Woodlands, TX (US); Tze-Lee Phang, Katy, TX (US)

(73) Assignee: ILLINOIS TOOL WORKS, INC., Glenview, IL (US)

(*) Notice: Subject to any disclaimer, the term of this patent is extended or adjusted under 35 U.S.C. 154(b) by 250 days.

(21) Appl. No.: 13/670,210

(22) Filed: Nov. 6, 2012

(65) Prior Publication Data

US 2013/0189427 A1    Jul. 25, 2013

Related U.S. Application Data

(60) Provisional application No. 61/590,501, filed on Jan. 25, 2012.

(51) Int. Cl.
| | | |
|---|---|---|
| *C09D 139/06* | (2006.01) | |
| *C09D 5/00* | (2006.01) | |
| *C09D 133/00* | (2006.01) | |

(52) U.S. Cl.
CPC .............. *C09D 139/06* (2013.01); *C09D 5/008* (2013.01); *C09D 133/00* (2013.01)

(58) Field of Classification Search
CPC .. C09D 139/06; C09D 133/00; C09D 131/04; C09D 5/008
USPC .......................................................... 524/386
See application file for complete search history.

(56) References Cited

U.S. PATENT DOCUMENTS

| | | | | |
|---|---|---|---|---|
| 4,886,660 | A | * 12/1989 | Patel et al. | ............... 424/70.13 |
| 5,550,179 | A | *  8/1996 | Srourian | ........................ 524/210 |
| 5,604,282 | A | *  2/1997 | Grogan et al. | ............... 524/232 |
| 2004/0213744 | A1 | * 10/2004 | Lulla et al. | ....................... 424/45 |

FOREIGN PATENT DOCUMENTS

| | | |
|---|---|---|
| EP | 0121874 | 10/1984 |
| GB | 1032367 | 6/1966 |
| GB | 2091276 | 7/1982 |
| GB | 2091276 A * | 7/1982 |

* cited by examiner

*Primary Examiner* — Ling Choi
*Assistant Examiner* — Lanee Reuther
(74) *Attorney, Agent, or Firm* — Blue Filament Law PLLC; Avery N. Goldstein

(57) ABSTRACT

A process of protecting a vehicle wheel or hub is provided that includes the application to the vehicle wheel or hub of a composition. The composition includes a water soluble polymeric film former, a plasticizer and a carrier that solubilizes or suspends the film former and the plasticizer. After allowing the composition to dry to form a coating, the coating is exposed to debris contaminants. The coating and the debris contaminants are then removed. The coating is readily removed by water washing alone.

19 Claims, No Drawings

VEHICLE WHEEL AND HUB PROTECTANT FILM AND COMPOSITION FOR THE FORMATION THEREOF

RELATED APPLICATIONS

This application is a non-provisional application that claims priority benefit of US Provisional Application Ser. No. 61/590,501 filed Jan. 25, 2012; the contents of which are hereby incorporated by reference.

FIELD OF THE INVENTION

The present invention in general relates to a coating composition for various substrates and to a substrate coated with such composition, and in particular, to a protective coating composition for a vehicle wheel or vehicle hub.

BACKGROUND OF THE INVENTION

Automotive wheels have a tendency to accumulate brake dust, road dust, and grime as extraneous contaminants. The severity of this tendency depends on the type of vehicle, wheel material, brake pad, brake disc/drum materials, driving habits, weather, traffic conditions, and various other factors. If the contaminants have sufficient residence time on the wheel, subsequent removal becomes difficult and eventually leads to wheel surface damage such as pitting.

While there are numerous wheel protection products that are based on hydrophobic substances such as fluoropolymers, these products tend to have poor coating durability. These products also represent a bioaccumulant.

Thus, there is a need for a wheel and hub protectant that is hydrophilic and readily applied to a subject wheel to protect the wheel surface from contaminant buildup and pitting.

SUMMARY OF THE INVENTION

A process of protecting a vehicle wheel or hub is provided that includes the application to the vehicle wheel or hub of a composition. The composition includes a water soluble polymeric film former, a plasticizer and a carrier that solubilizes or suspends the film former and the plasticizer. After allowing the composition to dry to form a coating, the coating is exposed to debris contaminants. The coating and the debris contaminants are then removed. The coating is readily removed by water washing alone.

The composition is well suited for forming a protective coating on a vehicle wheel or hub includes a water soluble polymeric film former of at least one of a lactide, an acrylic, a vinyl pyrrolidone, a vinyl acetate, a vinyl alcohol, combinations thereof, and copolymers thereof; along with a plasticizer, and a carrier that solubilizes or suspends the film former and the plasticizer.

DESCRIPTION OF THE PREFERRED EMBODIMENTS

The present invention has utility as a coating composition for protecting a vehicle wheel or a vehicle hub. An inventive composition includes a water soluble polymeric film former which dries to a transparent film, along with a water soluble plasticizer, and a carrier that dissolves or suspends the composition components and other optional additives. Upon application of an inventive composition to a wheel substrate or hub substrate, the carrier evaporates leaving protective coating to which contaminants adhere, the film and adherent contaminants are readily removed simply by wash rinse. Absent a water rinse, the inventive coating is stable and operative under driving conditions for several weeks.

A water soluble film polymeric film former operative herein includes a lactide, an acrylic, a vinyl pyrrolidone, a vinyl acetate, a vinyl alcohol, combinations of the aforementioned polymers, and copolymers containing at least one of the aforementioned polymers. Typically, a water soluble polymeric film former is present from 2 to 30 total weight percent of the composition. Preferably, water soluble film polymeric film former is present from 5 to 20 total weight percent of the composition; the specific amount of the film former present depends upon factors that include film former molecular weight, composition viscosity, mode of application to a wheel. Typical molecular weights for a film former according to the present invention range from 500 to 50,000 Daltons, and preferably from 5,000 to 30,000 Daltons.

A plasticizer for the polymeric film former is also provided. A plasticizer is soluble in the solvent and illustratively includes polyalkyl glycols such as a polyethylene glycol or a polypropylene glycol. The plasticizer typically is a polyalkyl glycol with a molecular weight of 200-6,000 Daltons; polyols such as glycerol, and propylene glycol; sorbitol; an organic ester such as triacetin, a citrate such as triethyl citrate. These plasticizers are used individually or in combination. Typically, a plasticizer is present from 0.1 to 10 total weight percent of the composition. Preferably, the plasticizer is present from 0.2 to 5 total weight percent of the composition.

Optional additives in an inventive composition illustratively include a wetting agent, defoaming agent, corrosion inhibitor, leveling agent, biocide, and visible- or UV-light stabilizer. A wetting agent illustratively includes ethoxylated nonionic superwetter, and is typically being present from 0 to 0.5 total weight percent and preferably between 0.001 and 0.1 total weight percent. A defoaming agent illustratively includes FOAMASTER V® (Cognis) and is typically being present from 0 to 0.2 total weight percent and preferably between 0.001 and 0.1 total weight percent. A corrosion inhibitor illustratively includes sodium benzoate, and is typically being present from 0 to 2 total weight percent and preferably between 0.005 and 1 total weight percent. A leveling agent illustratively includes DREWFAX 860® (Ashland Specialty Chemicals), and is typically being present from 0 to 1 total weight percent and preferably between 0.05 and 0.5 total weight percent. A biocide includes quaterniums, triclosan, PCMX, and other conventional antibacterials. The biocide is typically being present from 0 to 2 total weight percent and preferably between 0.005 and 0.5 total weight percent. A light stabilizer illustratively includes TINUVIN 292® (BASF Resins), and is typically being present from 0 to 3 total weight percent and preferably between 0.05 and 1 total weight percent.

A carrier is also provided that is present that is capable of dissolving or suspending the inventive composition components including the polymeric film former and a plasticizer. The carrier preferably dries relatively quickly under ambient conditions of 20° C. to facilitate film former coating formation. Carriers operative herein illustratively include water, $C_1$-$C_{12}$ alcohols such as isopropanol, ethanol, methanol; acetone; methylethyl ketone and combinations thereof While an inventive composition is readily applied to a substrate by swabbing or pump spray, it is appreciated that coating uniformity is readily obtained by application from a spray aerosol can. As such, a propellant is optionally added in a range from 5 to 95 total weight percent with the proviso that the propellant and carrier together do not exceed 97 total weight percent of the formulation. Suitable propellants illustratively include alkanes such as butane, pentane, isobutane, propane; ethers such as dimethyl ether, diethyl ether, nitrogen; halogenated hydrocarbons; carbon dioxide and combinations thereof. The resultant formulation inclusive of a propellant is seated within a conventional metal aerosol canister and applied by spray application.

Regardless of the mode of application of an inventive composition to a substrate, the resultant coating, upon carrier evaporation, is greater than 30 dry film weight percent of polymeric film former and preferably greater than 80 dry film weight percent. By way of example, a 50/50 vinyl pyrrolidone/vinyl acetate copolymer represents greater than 65 dry film weight percent of a film produced from an inventive composition and containing a full complement of optional additives as detailed herein. The resulting coating is amenable to exposure to road debris and brake dust for several weeks, for example from 1 to 4 weeks and upon being decorated with debris, the coating and decorating debris are removed simply by exposing to rinse water alone or with an optional aqueous surfactant solution. The surfactant being a conventional consumer soap or detergent.

The formulary of an inventive composition is summarized below in Table 1. TABLE-US-00001 TABLE 1 Inventive Cleaning Composition (exclusive of propellants).

TABLE 1

Inventive Cleaning Composition (exclusive of propellants). [Please confirm and add values]

|  | Typical Amount Total Wt. Percent | Pref. Amount - Total Wt. Percent |
|---|---|---|
| Component | | |
| Polymeric film former | 2-30 | 5-20 |
| Plasticizer | 0.1-10 | 0.2-5 |
| Carrier | to 100% | to 100% |
| Optional components | | |
| Wetting agent | 0-0.5 | 0.001-0.1 |
| Defoaming agent | 0-0.2 | 0.001-0.1 |
| Corrosion inhibitor | 0-2 | 0.005-1 |
| Leveling agent | 0-1 | 0.05-0.5 |
| Biocide | 0-2 | 0.005-0.5 |
| Light Stabilizer | 0-3 | 0.05-1 |

Specific exemplary formulations of an inventive composition are provided, unless noted otherwise, all percentages for the specific formulation are total weight percentages.

Inventive Composition 1.

| Ingredient | Weight |
|---|---|
| De-ionized water | 78.6% |
| Sodium benzoate | 0.1% |
| 2-Amino-2-methyl-1-propanol 95% | 0.2% |
| Biocide | 0.1% |
| Polyalkyl glycol | 1.0% |
| Isopropanol | 10.0% |
| 50/50 Vinyl pyrrolidone and vinyl acetate copolymer | 10.0% |
| total | 100.0% |

Inventive Composition 2.

| Ingredient | Weight |
|---|---|
| Isopropanol | 89.0% |
| Polyalkyl glycol | 1.0% |
| Vinyl pyrrolidone and vinyl acetate copolymer | 10.0% |
| total | 100.0% |

Inventive Composition 3.

| Ingredient | Weight |
|---|---|
| 95% Ethanol | 89.0% |
| Polyalkyl glycol | 1.0% |
| 50/50 Vinyl pyrrolidone and vinyl acetate copolymer | 10.0% |
| total | 100.0% |

The advantages of this invention are more particularly shown by the following example in which the parts and percentages are by weight unless otherwise indicated.

Example 1

Inventive composition 2 is aerosolized with a pump spray and applied to the pre-cleaned wheels of a vehicle which is known to have a tendency to rapidly accumulate brake dust on the vehicle wheels. Spray application to the mounted tire is minimized. To show the effect of the wheel protectant coating produced by the drying of an inventive composition, half of each of the vehicle wheels is treated with a spray coating and the other half is masked during spraying and is uncoated. After two weeks and about 1,200 miles of driving, the wheels collect a substantial amount of contaminant debris. The wheel is then simply water rinsed using a garden hose and no other means of cleaning is applied. The half of the wheel treated is free from brake dust or other contaminant whereas the untreated half of the same wheel is visibly dirty even after equally rinsed.

Example 2

The process of Example 1 is repeated with the formulation of inventive composition 1 in place of inventive composition 2 with similar results.

Example 3

The process of Example 1 is repeated with 10% of vinyl pyrrolidone and vinyl acetate copolymer as the polymeric film former and a corresponding change in the amount of carrier relative tot the formulation of inventive composition 2 with like results.

Example 4

The process of Example 1 is repeated with 15% of vinyl pyrrolidone and vinyl acetate copolymer as the polymeric film former and a corresponding change in the amount of carrier relative to the formulation of inventive composition 2 with like results.

Example 5

The process of Example 1 is repeated with 20% of vinyl pyrrolidone and vinyl acetate copolymer as the polymeric film former and a corresponding change in the amount of carrier relative to the formulation of inventive composition 2 with like results.

Example 6

The process of Example 1 is repeated with 1% of Polyalkyl glycol as the plasticizer and a corresponding change in the amount of carrier relative to the formulation of inventive composition 2 with like results.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof are intended to define the scope of the invention.

The invention claimed is:

1. An article comprising:
a composition comprising:
a water soluble polymeric film former of vinyl pyrrolidone and vinyl acetate copolymer, said film former present from 2 to 30 total weight percent;
a plasticizer; and
a carrier that solubilizes or suspends said film former and said plasticizer;
a vehicle wheel or hub having the composition thereon.

2. The article of claim 1 wherein said plasticizer is a polyalkyl glycol.

3. The article of claim 1 wherein said plasticizer is present from 0.1 to 10 total weight percent.

4. The article of claim 1 wherein said carrier includes at least one of water, isopropanol, or ethanol.

5. The article of claim 1 wherein said carrier is present at greater than 50 percent by weight.

6. The article of claim 1 further comprising at least one additive of a wetting agent, defoaming agent, corrosion inhibitor, leveling agent, biocide, or visible- or UV-light stabilizer.

7. The article of claim 6 wherein said corrosion inhibitor is present and said corrosion inhibitor is a benzoate.

8. The article of claim 6 wherein said corrosion inhibitor is present in an amount of 0.005 and 1 total weight percent.

9. The article of claim 6 wherein said leveling agent is present in an amount of 0.05 and 0.5 total weight percent.

10. The article of claim 6 wherein said biocide is present in an amount of 0.005 and 0.5 total weight percent.

11. The article of claim 6 wherein said light stabilizer is present in an amount of 0.05 and 1 total weight percent.

12. The article of claim 6 wherein said defoaming agent is present in an amount of 0.001 and 0.1 total weight percent.

13. The article of claim 1 wherein said vinyl pyrrolidone and vinyl acetate copolymer is a 50/50 ratio of vinyl pyrrolidone/vinyl acetate.

14. The article of claim 13 wherein upon evaporation of said carrier, greater than 65 dry film weight percent of a resultant film is said polymeric film former.

15. The article of claim 1 wherein upon evaporation of said carrier greater than 30 dry film weight percent of a resultant film is said polymeric film former.

16. The article of claim 1 wherein upon evaporation of said carrier greater than 80 dry film weight percent of a resultant film is said polymeric film former.

17. The article of claim 1 wherein said polymeric film former has a molecular weight of from 500 to 50,000 Daltons.

18. The article of claim 1 wherein said polymeric film former has a molecular weight of from 5,000 to 30,000 Daltons.

19. The article of claim 1 wherein said plasticizer has a molecular weight of from 200 to 6,000 Daltons.

* * * * *